(12) United States Patent
Barbat et al.

(10) Patent No.: US 12,606,111 B2
(45) Date of Patent: Apr. 21, 2026

(54) VEHICLE WITH BUMPER AND CRUSH CAN

(71) Applicant: Ford Global Technologies, LLC, Dearborn, MI (US)

(72) Inventors: Saeed D. Barbat, Novi, MI (US); Mohammad Omar Faruque, Ann Arbor, MI (US); Dean M. Jaradi, Macomb, MI (US); S.M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 367 days.

(21) Appl. No.: 18/347,602

(22) Filed: Jul. 6, 2023

(65) Prior Publication Data

US 2025/0010808 A1    Jan. 9, 2025

(51) Int. Cl.
B60R 19/34        (2006.01)
B60R 19/02        (2006.01)
B60R 19/20        (2006.01)
(52) U.S. Cl.
CPC ............ B60R 19/34 (2013.01); B60R 19/023 (2013.01); B60R 19/20 (2013.01)

(58) Field of Classification Search
CPC ....... B60R 19/20; B60R 19/205; B60R 19/24; B60R 19/26; B60R 19/32; B60R 19/34; B60R 19/40
USPC .......................... 293/107, 118, 122, 132, 133
See application file for complete search history.

(56) References Cited

U.S. PATENT DOCUMENTS

| | | | |
|---|---|---|---|
| 7,416,043 B2 * | 8/2008 | Pipkorn | F16F 7/125 |
| | | | 180/274 |
| 8,672,078 B2 | 3/2014 | Lee et al. | |
| 8,827,353 B2 | 9/2014 | Kim | |
| 9,266,496 B2 | 2/2016 | Le et al. | |
| 9,701,267 B1 * | 7/2017 | Ohmura | B60R 19/483 |
| 2022/0001927 A1 | 1/2022 | Narahara et al. | |

* cited by examiner

*Primary Examiner* — Jason S Daniels
(74) *Attorney, Agent, or Firm* — Frank A. MacKenzie; Brooks Kushman P.C.

(57)        ABSTRACT

A vehicle includes a vehicle frame, a vehicle bumper and a crush can to support the vehicle bumper on the vehicle frame. The crush can may include an inflation chamber, which is inflatable from an uninflated state to an inflated state. The vehicle can also include an inflator in fluid communication with the inflation chamber of the crush can.

22 Claims, 6 Drawing Sheets

VEHICLE WITH BUMPER AND CRUSH CAN

BACKGROUND

Vehicles include bumpers that are designed to absorb and/or transfer energy during certain vehicle events, such as certain frontal impacts. Impacts may occur with objects of varying size and mass. Vehicle bumpers may have a stiffness determined by the material and/or structure of the bumper and other components of the vehicle.

DETAILED DESCRIPTION

Figure 1:
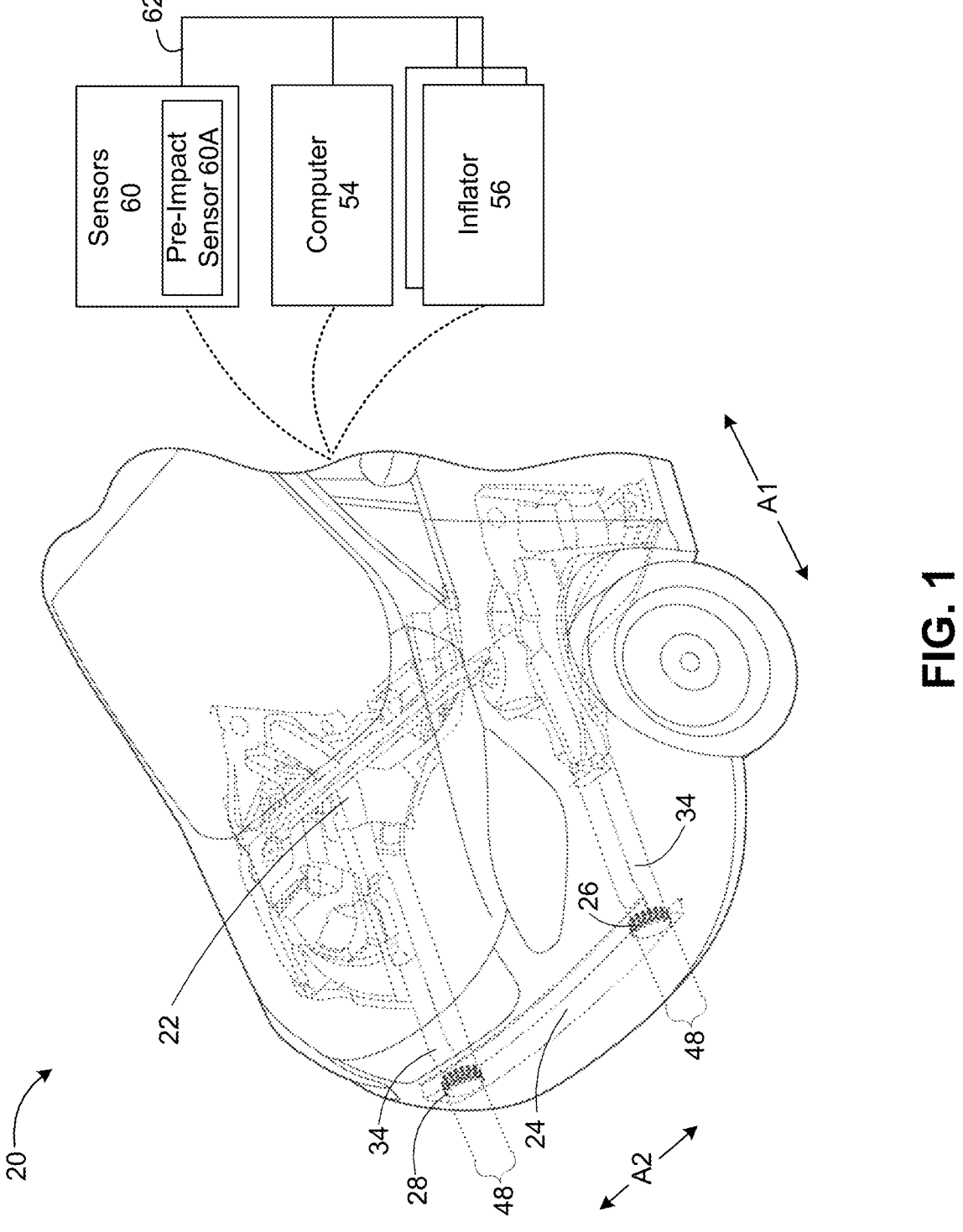
FIG. 1 is a perspective view of a front portion of a vehicle including a bumper and frame rails of the vehicle shown in dashed lines.

In an example, a vehicle can include a vehicle frame and a vehicle bumper. The vehicle can also include a crush can supporting the vehicle bumper on the vehicle frame in which the crush can includes an inflation chamber and being inflatable from an uninflated state to an inflated state. The vehicle can also include an inflator in fluid communication with the inflation chamber of the crush can.

The crush can of the vehicle can elongate along a vehicle-longitudinal axis from the uninflated state to the inflated state.

The crush can of the vehicle can be made from a metallic material.

The crush can of the vehicle can be tubular with a central axis extending vehicle-forward from the vehicle frame to the vehicle bumper. The crush can may include a first base, a second base, and a side wall that extends from the first base to the second base about the central axis in which the first base, the second base, and the side wall surround the inflation chamber.

The crush can of the vehicle can include a side wall that is generally cylindrical.

The crush can of the vehicle can include a side wall that is sealed to the first base and to the second base.

The crush can of the vehicle can include a side wall that includes ribs that extend annularly about the central axis.

The vehicle bumper can include a cavity facing the vehicle frame in which the crush can is disposed in the cavity.

The crush can may be fixed directly to the vehicle bumper and the vehicle frame.

The vehicle frame can include a frame rail elongated along a vehicle-longitudinal axis and the crush can may be fixed to a forward face of the frame rail.

The vehicle can include a second crush can spaced cross-vehicle from the crush can, the second crush can supporting the vehicle bumper on the vehicle frame, the second crush can having an inflation chamber and being inflatable from an uninflated state to an inflated state.

The vehicle frame can include a first frame rail and a second frame rail each elongated along a vehicle-longitudinal axis and spaced from each other cross-vehicle, the crush can being on the first frame rail and the second crush can being on the second frame rail.

The inflator of the vehicle can be designed to generate a pressure within the inflation chamber of the crush can of between 138 kilopascals and 241 kilopascals.

The crush can may be operable to bear a load of approximately one-half a weight of the vehicle bumper in a direction perpendicular to a central axis of the crush can.

In an example, a vehicle-bumper assembly can include a vehicle bumper and a first crush can having a first base, which is positioned in a cavity of the vehicle bumper. The first crush can may include an exposed (second) base for attachment to a forward face of a first frame rail of the vehicle. The first crush can may additionally include a first inflation chamber to transition from an uninflated state to an inflated state. The vehicle bumper assembly may additionally include a second crush can having a first base positioned in the cavity of the vehicle bumper. The second crush can may also include an exposed (second) base to attach to a forward face of a second frame rail of the vehicle. The second crush can may additionally include an inflation chamber to transition from an uninflated state to an inflated state. The first crush can and the second crush can are operable to bear a combined load that includes a weight of the vehicle bumper when the first crush can and the second crush can are in the uninflated state.

The vehicle-bumper assembly may also include a first inflator in fluid communication with the inflation chamber of the first crush can. The first inflator to transition the first crush can from the uninflated state to the inflated state responsive to a first electrical signal. The vehicle-bumper assembly may also include second inflator in fluid communication with the inflation chamber of the second crush can, which operates to transition the second crush can from the uninflated state to the inflated state responsive to a second electrical signal.

The vehicle-bumper assembly can also include a first inflator in fluid communication with the first inflation chamber, wherein the first inflator can be designed to generate a pressure of between 138 kilopascals and 241 kilopascals for a duration of between 20 milliseconds and 40 milliseconds.

The first crush can and the second crush can of the vehicle-bumper assembly may include a substantial percentage of a material that permits elongation between the uninflated state and the inflated state of between 15% and 150%.

The first crush can and the second crush can may include a circular cross-section having a diameter of between 40 millimeters and 60 millimeters and a length of 60 millimeters to 90 millimeters in the uninflated state.

With reference to the Figures, wherein like numerals indicate like parts throughout the several views, vehicle 20 includes a frame 22 and bumper 24. Vehicle frame 22 may include one or more frame rails 34 that support other components of vehicle 20. Frame rails 34 may be elongated along longitudinal axis A1. Frame rails 34 may be spaced from each other along lateral axis A2, e.g., first frame rail 34 at the right side of vehicle 20 and a second frame rail 34 at the left side of vehicle 20. Frame rails 34 may be hollow, e.g., defining an interior channel. Frame rails 34 may be rectangular in cross-section.

Figure 3:
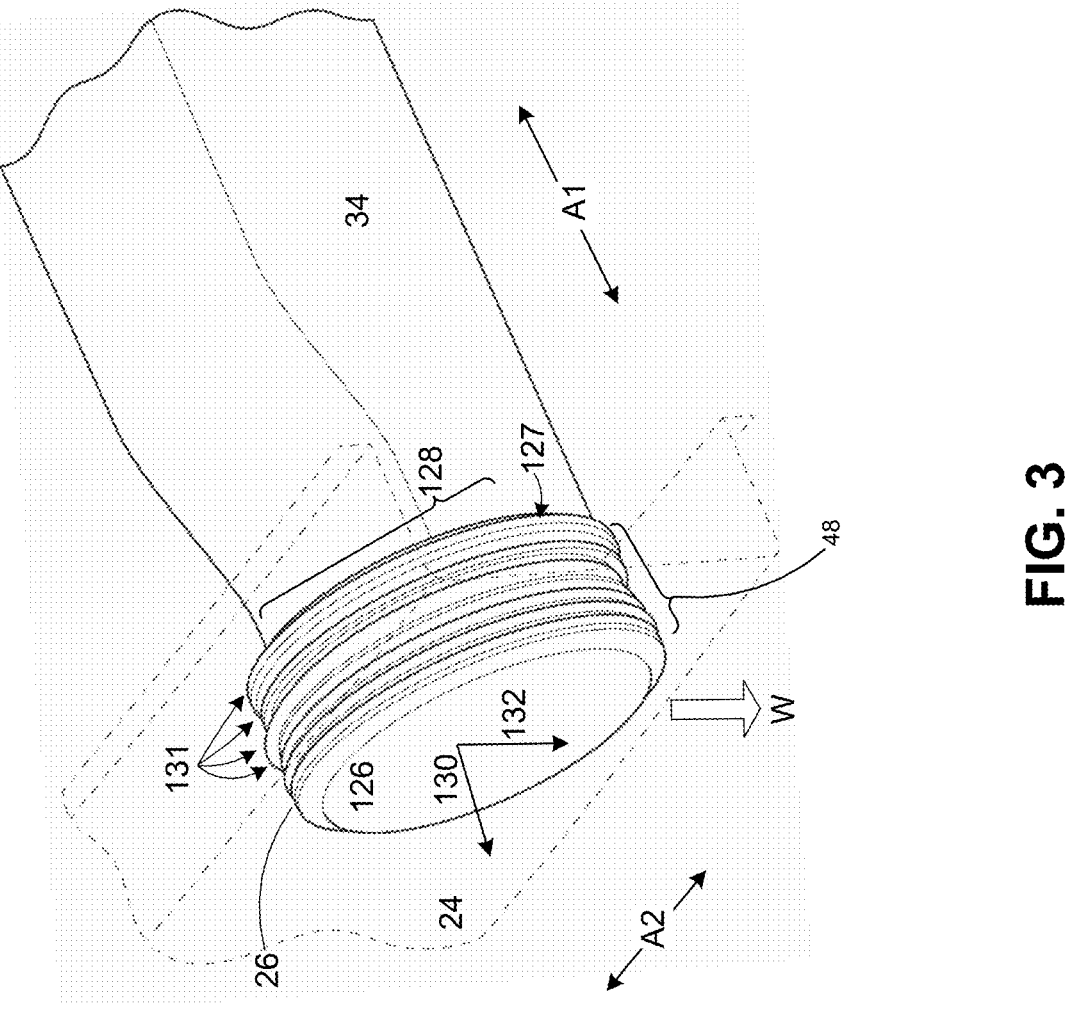
FIG. 3 is a perspective view of a portion of a vehicle bumper, a crush can in an uninflated state, and a portion of the frame rails of the vehicle.

A vehicle bumper assembly of vehicle 20 includes first crush can 26 attached to a forward face of first frame rail 34. The vehicle bumper assembly additionally includes second crush can 28 attached to a forward face of second frame rail 34. First crush can 26 can be positioned between the forward face of first frame rail 34 and bumper 24. In an example, first crush can 26 can be positioned within cavity 48 of bumper 24. Vehicle 20 also includes second crush can 28 (FIG. 5) attached to a second frame rail 34. Second crush can 28 can be positioned between second frame rail 34 and bumper 24. First crush can 26 and second crush can 28, positioned cross-vehicle from each other, may support the weight of bumper 24 when the first and second crush cans are in an uninflated state. In the context of this disclosure, "supporting," or forms thereof, means to bear the weight of an object. Accordingly, as seen in FIG. 3, the combination of first crush can 26 and second crush can 28 bear the weight of bumper 24, and operate to transfer such weight to respective front faces of first and second frame rails 34.

Vehicle 20 includes one or more inflators 56. In the example shown in the Figures, vehicle 20 includes two inflators, namely first and second inflators 56. The first inflator 56 may be attached to first frame rail 34 and may be in fluid communication with first crush can 26 and second inflator 56 may be attached to second frame rail 34 and may be in fluid communication with second crush can 28. Inflators 56 may each include a pyrotechnic charge, which, responsive to actuation, operate to inflate first crush can 26 and second crush can 28 in response to a signal from pre-impact sensor 60A. Thus, prior to certain vehicle impacts, one or more of crush cans 26 and 28 can elongate to exert a force in a vehicle-forward direction, such as along longitudinal axis A1, which operates to displace bumper 24 in a vehicle-forward direction with respect to first and second frame rails 34. Accordingly, responsive to displacement of bumper 24 in a vehicle-forward direction, crush cans 26 and 28 may provide a capability for vehicle 20 to absorb kinetic energy. Crush cans 26 and 28 are designed to elongate along longitudinal axis A1 when inflated by respective inflator 56. Crush cans 26 and 28 may have a geometry to encourage elongation when inflated, e.g., annular ribs 131 (described further below), accordion folds, annular corrugations, etc. Crush cans 26 and 28 may be constructed from a metallic material, such as copper, brass, mild or low-carbon steel (e.g., a steel having a carbon content of between about 0.05% and 2.1%). The geometry, wall thickness, and material type facilitate elongation along the longitudinal axis A1 when inflated by the respective inflator 56. In an example, crush cans 26 and 28 may elongate by an amount of between 15% to 100% in response to the transition from an uninflated state to an inflated state.

Vehicle 20 may be any suitable type of automobile, e.g., a passenger or commercial automobile, such as a sedan, a coupe, a truck, a sport utility vehicle, a crossover vehicle, a van, a minivan, a taxi, a bus, etc. Vehicle 20 may have body-on-frame construction (also referred to as a cab-on-frame construction), in which the vehicle body and vehicle frame 22 are separate components, i.e., are modular, and the vehicle body is supported on and affixed to vehicle frame 22. In another example, the vehicle body and vehicle frame 22 may have a unibody construction in which vehicle frame 22 is unitary with the vehicle body (including frame rails 34, pillars, roof rails, etc.). In other examples, vehicle frame 22 and the body of vehicle 20 may have any suitable construction. Vehicle frame 22 and vehicle body may be of any suitable material, for example, steel, aluminum, and/or fiber-reinforced plastic, etc.

Frame rails 34 can be elongated along the vehicle-longitudinal axis L. Frame rails 34 can be spaced from each other in a cross-vehicle direction (e.g., along cross-vehicle axis A2). Cross beams of vehicle frame 22 can extend from first frame rail 34 to second frame rail 34, via traversing along cross-vehicle axis A1.

Frame rails 34 may define the cross-vehicle boundaries of vehicle frame 22. Frame rails 34 may be elongated along the vehicle-longitudinal axis A1 from a rear end of vehicle 20 to a front end of the vehicle. For example, frame rails 34 may extend along substantially the entire length of vehicle 20. In other examples, frame rails 34 may be segmented and extend under portions of vehicle 20, e.g., at least extending from below a passenger compartment of vehicle 20 to the front end of the vehicle. In some examples, frame rails 34 may be unitary from the rear end of vehicle 20 to the front end of the vehicle. In other examples, frame rails 34 may include segments fixed to each other (e.g., by welding, threaded fastener, etc.) and, in combination, extending from a rear end of vehicle 20 to the front end of the vehicle.

As set forth above, vehicle frame 22 may include body-on-frame construction in which the vehicle body is supported on and affixed to vehicle frame 22. In such an example, frame rails 34 can include cab mount brackets (not shown) on which the vehicle body is supported and affixed. The cab mount brackets are fixed to frame rails 34, e.g., welded to frame rails 34. The cab mount brackets may extend outboard from frame rails 34. The cab mount brackets can be operable to support the vehicle body in a body-on-frame configuration. In an example, during assembly of vehicle 20, the body of the vehicle can be set on vehicle frame 22 with fastening features of the vehicle body aligned with the cab mount brackets for engagement with the cab mount brackets.

Vehicle frame 22 may include suspension and steering attachment points (not shown) that support suspension and steering components of vehicle 20. As one example, the suspension and steering attachment points may be suspension towers. Suspension and steering components of vehicle 20 are connected to vehicle frame 22, at least in part, at the suspension towers. The suspension and steering components include suspension shocks, suspension struts, steering arms, steering knuckles, vehicle wheels, etc.

Frame rails 34 and vehicle cross-beams may be extruded, roll-formed, etc. Frame rails 34 and cross-beams of vehicle frame 22 may be of any suitable material, e.g., suitable types of steel, aluminum, and/or fiber-reinforced plastic, etc. Frame rails 34 and cross-beams may be hollow. Frame rails 34 and cross-beams may be rectangular in cross-section (e.g., a hollow rectangular cuboid), round in cross section, (e.g., a hollow, such as a hollow cylinder), etc. Vehicle bumper 24 extends transversely to frame rails 34, e.g., in a cross-vehicle direction C. Vehicle bumper 24 is elongated along cross-vehicle direction C. Vehicle bumper 24 is supported by the vehicle frame 22, i.e., the weight of the bumper is borne by vehicle frame 22. Vehicle bumper 24 may be a front bumper, as shown in the Figures. In other words, vehicle bumper 24 may be at a front portion of vehicle 20 and, in such examples, crush cans 26 and 28 are inflatable for certain frontal impacts of the vehicle.

Vehicle bumper 24 has a vehicle-forward face and a vehicle-rearward face. The vehicle-forward face may be a class-A surface, i.e., a surface specifically manufactured to have a high-quality, finished aesthetic appearance free of blemishes. As an example, the vehicle-forward face may be chromed. Vehicle bumper 24 may have a mounting bracket on the vehicle-rearward face of vehicle bumper 24 for attachment to crush cans 26 and 28. Vehicle bumper 24 includes a cavity 48 that faces vehicle frame 22. Cavity 48 faces vehicle-rearward. For example, as shown in the example in the Figures, vehicle bumper 24 may be U-shaped to define cavity 48. In some examples, cavity 48 extends cross-vehicle from one end of vehicle bumper 24 to the other end of vehicle bumper 24 such that cavity 48 is open from first crush can 26 to second crush can 28. In other examples, vehicle bumper 24 may include more than one cavity spaced cross-vehicle and receiving first crush can 26 and second crush can 28, respectively.

Vehicle 20 may include at least one pre-impact sensor 60A for sensing certain vehicle impacts (e.g., impacts of a certain magnitude, direction, etc.). Vehicle 20 may addition-ally include computer 54 in communication with pre-impact sensor 60A and inflators 56. First inflator 56 can be in fluid communication with first crush can 26 and a second inflator 56 can be in fluid communication with second crush can 28. Thus, computer 54 may activate one or more of inflators 56, e.g., via generation of an electrical signal to a pyrotechnic charge of the inflator, responsive to pre-impact sensor 60A sensing certain vehicle impacts. In this context, a "certain vehicle impact" is an impact of the type and/or magnitude for which inflation of crush cans 26 and 28 are designed, i.e., "certain" indicates the type and/or magnitude of the impact. The type and/or magnitude of such "certain vehicle impacts" may be pre-stored in computer 54, e.g., a restraints control module and/or a body control module. Pre-impact sensor 60A may be configured to sense certain vehicle impacts prior to impact, utilizing, for example, output data from one or more of sensors 60.

Sensors 60 of vehicle 20 may include a variety of devices other than pre-impact sensor and 60A, such as are known to provide data to the vehicle computer. For example, sensors 60 may include Light Detection And Ranging (LIDAR) vehicle sensor(s), etc., disposed on a top of the vehicle, behind a vehicle front windshield, around the vehicle, etc., that provide relative locations, sizes, and shapes of objects surrounding the vehicle. As another example, sensors 60 may include one or more radar vehicle sensors fixed to vehicle bumpers, which may provide data to provide loca-tions of the objects, second vehicles, etc., relative to the location of the vehicle. Sensors 60 may further, alternatively or additionally, include camera vehicle sensor(s), e.g., front view, side view, etc., providing images from an area sur-rounding the vehicle. In the context of this disclosure, an "object" means a physical, i.e., material, item that can be represented by physical phenomena (e.g., light or other electromagnetic waves, or sound, etc.) detectable by vehicle sensors. Thus, vehicles, as well as other items including as discussed below, fall within the definition of "object" herein.

Figure 2:
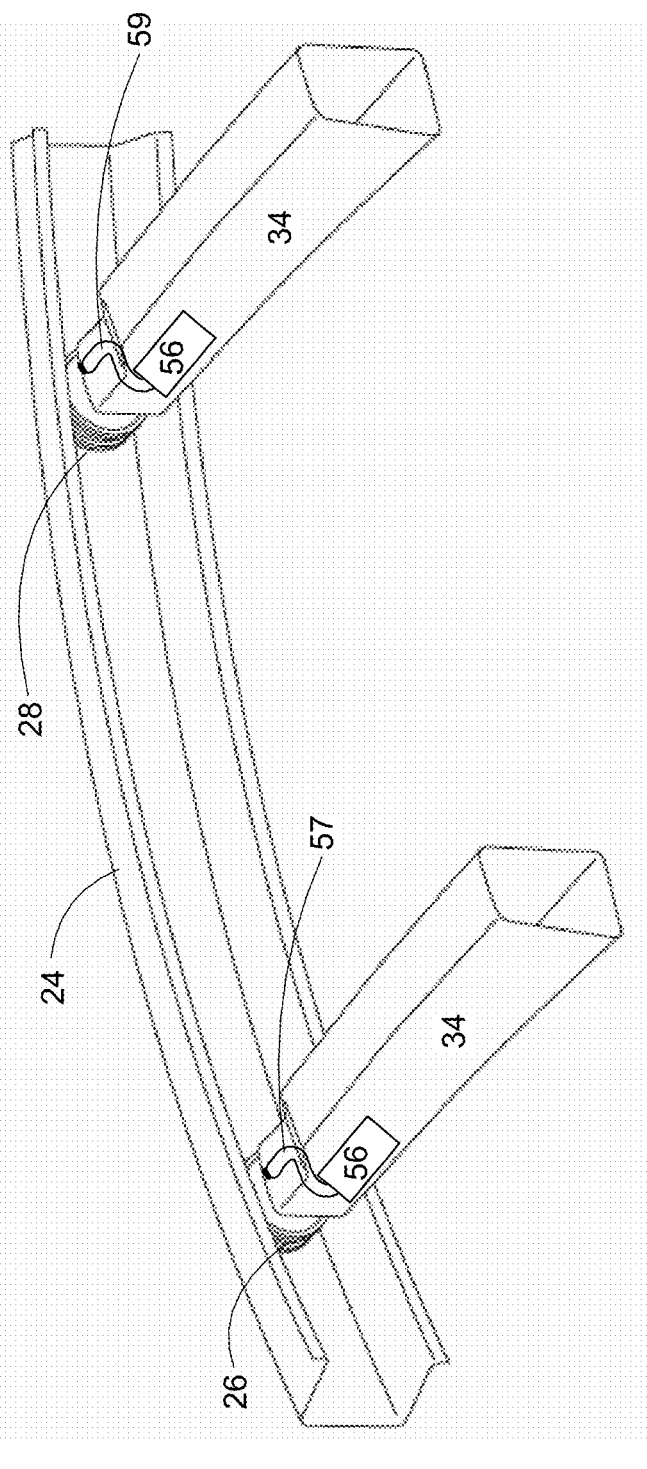
FIG. 2 is a rear view of a vehicle bumper, crush cans in uninflated states, and a portion of the frame rails of the vehicle.

FIG. 2 is a rear view of vehicle bumper 24, first crush can 26 and second crush can 28 (both in uninflated states), and a portion of frame rails 34 of vehicle 20. As shown in greater detail in FIG. 3, first crush can 26 is disposed within cavity 48 of bumper 24. Accordingly, the body of bumper 24 substantially surrounds first base 126 (FIG. 3) of crush can 26, leaving second base 127 (FIG. 3) exposed. Second base 127 may thus be capable of being fixed to a front face of first frame rail 34. Similarly, crush can 28 is disposed within the cavity (e.g., cavity 48 of FIG. 3) of bumper 24. The second base of crush can 28 can be fixed to second frame rail 34. In an example, first crush can 26 and second crush can 28 include a circular cross-section having a diameter of between 40 millimeters and 60 millimeters and a length of 60 millimeters to 90 millimeters in an uninflated state. In an example, the combination of first crush can 26 and second crush can 28 bear the weight of bumper 24, in which bumper 24 includes a weight of between 15 kilograms and 40 kilograms. In an example, first crush can 26 and second crush can 28 may be fabricated from a metallic material suitable for bearing the weight of bumper 24. In an example, first crush can 26 and second crush can 28 are each designed to bear at least one half the weight of bumper 24, e.g., in a direction parallel to the plane of first base 126 of first crush can 26. Crush cans 26 and 28 can be fixed to vehicle bumper 24, e.g., the vehicle-rearward face of vehicle bumper 24, in any suitable manner, e.g., welding, bracket, threaded fas-tener, and/or adhesive, etc. Crush can 26 can be fixed to first frame rail 34 and crush can 28 can be fixed to second frame rail 34 in any suitable manner, e.g., welding, bracket, threaded fastener, and/or adhesive, etc.

Crush cans 26 and 28 each define an inflation chamber 128. Walls of crush cans 26 and 28 completely enclose inflation chamber 128, i.e., with no fluid flow from through or between the walls, so that inflation medium from inflator 56 pressurizes inflation chamber 128 to expand crush can 26, 28 from the uninflated state to the inflated state. The walls of crush cans 26 and 28 may be sealed to each other by, for example, unitary formation, welding, adhesive, bonding, etc.

As seen in FIG. 2, first crush can 26 and second crush can 28 are each coupled to an inflator 56. First inflator 56 may be affixed to first frame rail 34 and in fluid communication with first crush can 26 via fluid conduit 57. In this context, the term "fluid communication" means capable of receiving a fluid input from a source. In this context, the term "fluid" may mean a compressible fluid, such as a gas. A second inflator 56 may be affixed to second frame rail 34 and in fluid communication with second crush can 28 via second fluid conduit 59. As described in reference to FIG. 1, inflators 56 may receive an electrical signal from pre-impact sensor 60A, which may activate, for example, a pyrotechnic charge within first and second crush cans 26 and 28, which may operate to expand the crush can, thereby extending bumper 24 away from frame rails 34. Accordingly, prior to encoun-tering an object, bumper 24 may extend away from frame rails 34. As a consequence of the extension of bumper 24 away from frame rails 34, at least some of the kinetic energy brought about by encountering the object may be absorbed.

Inflators 56 may be supported by any suitable component. For example, inflators 56 may be supported by a housing fixed to frame rail 34, e.g., by threaded fastener, bracket, etc. Inflators 56 may include, for example, a pyrotechnic inflator that initiates an exothermic chemical reaction to generate the inflation medium. A pyrotechnic inflator may include a charge formed from a solid mixture of substances that, when ignited, react to produce a gaseous inflation medium. For example, the pyrotechnic charge may be formed of sodium azide ($NaNO_3$), potassium nitrate ($KNO_3$), and silicon diox-ide ($SiO_2$), which react to form nitrogen in a gaseous form ($N_2$). In another example, inflators 56 may include a stored gas inflator that releases stored (e.g., pressurized) gas as an inflation medium, e.g., via a pyrotechnically-initiated valve. In another example, inflators 56 may operate via a hybrid process utilizing a stored gas and a gas generated via a combustible exothermic chemical reaction. In an example, inflator 56 may be disposed within inflation chambers 128 (FIG. 3) of first crush can 26 and second crush can 28 to deliver an inflation medium from within inflation chamber 128. In an example, inflator 56 may be designed to generate a pressure of between 138 kilopascals and 241 kilopascals for a duration of between 20 milliseconds and 40 millisec-onds.

FIG. 3 is a perspective view of a portion of a vehicle bumper, a crush can in an uninflated state, and a portion of frame rails 34 of vehicle 20. As seen in FIG. 3, crush can 26 includes first base 126, positioned at a first side of crush can 26, and second base 127, positioned at an opposite side of first crush can 26. First base 126 is positioned to contact and to rest within cavity 48 of bumper 24. Bumper 24 thus substantially surrounds the body of crush can 26, leaving second base 127 exposed and to be mounted to the front face of frame rail 34. Mounting of crush can 26 to the front face of frame rail 34, via second base 127, may be achieved by securing second base 127 to a metallic plate and mounting the metallic plate at the forward face of frame rail 34. During the transition between an uninflated state and an inflated state, annular ribs 131 in the side wall of crush can 26 operate to maintain the generally cylindrical shape of crush can 26. The sidewall of crush can 26 are sealed to first base 126 and second base 127.

Crush can 26 includes central axis 130, which extends substantially perpendicular to first base 126 and second base 127 so as to be oriented parallel to vehicle longitudinal axis A1. Crush can 26 may be constructed utilizing a metallic material capable of bearing the weight of a portion, e.g., approximately 50%, of the weight (W) of bumper 24. Accordingly, crush can 26 may include shear stress properties so as to be capable of supporting the portion of the weight of bumper 24 in a direction parallel to the surface of first base 126, such as along direction 132. In an example, in response to fluid flow, such as a gas, from inflator 56, inflation chamber 128 may be elongated so as to increase to a volume appropriate for elongating first crush can 26 by an amount of between 15% and 100%. In some examples, inflation chamber 128 may be lined by a flexible nylon fabric, a high-strength low-alloy steel, or other suitable material, which surrounds inflation chamber 128 between the inflation chamber and walls of crush can 26, 28.

Figure 4:
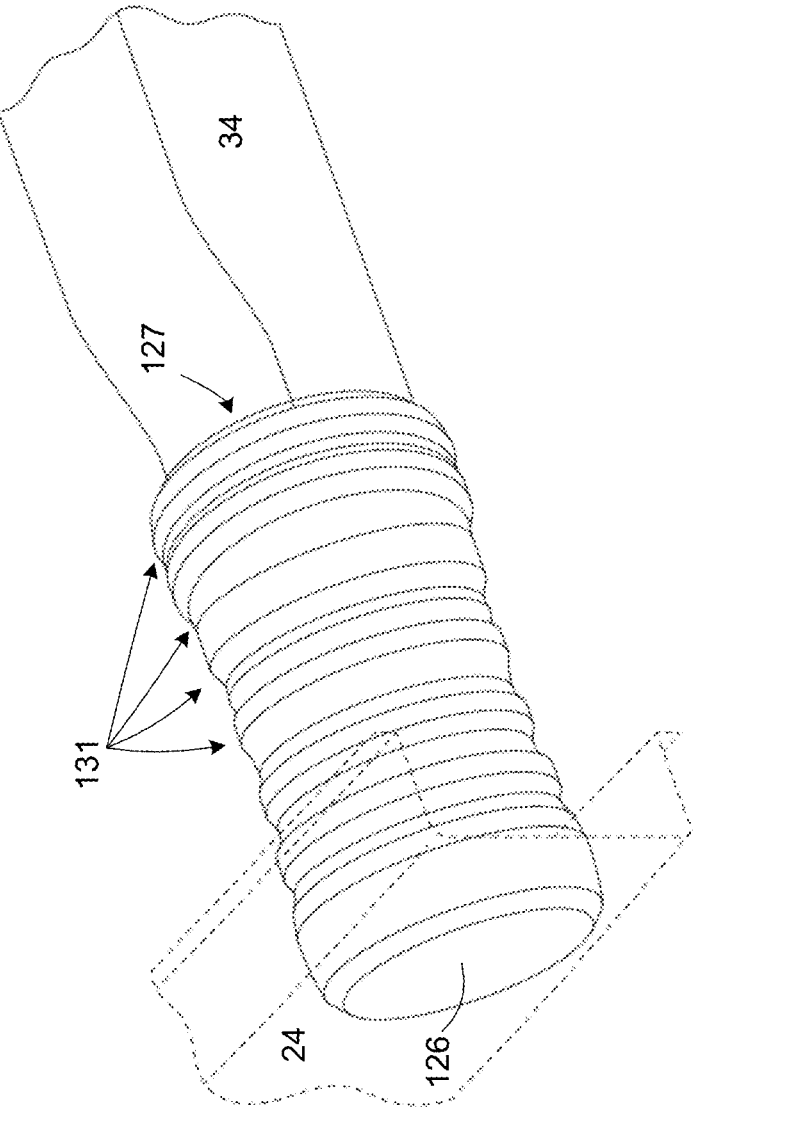
FIG. 4 is a perspective view of a portion of a vehicle bumper, a crush can in an inflated state, and a portion of the frame rails of the vehicle.

FIG. 4 is a perspective view of a portion of vehicle bumper 24, crush can 26, 28 in an inflated state, and a portion of frame rail 34 of vehicle 20. Crush cans 26 and 28 support vehicle bumper 24 on frame rails 34 in both the uninflated and inflated states of crush cans 26 and 28. As shown in FIG. 4, after transition of crush can 26 from an uninflated to an inflated state, first base 126 of crush can 26 remains in contact with bumper 24, and second base 127 remains in contact with a forward face of frame rail 34. Inflation of first crush can 26 operates to displace bumper 24 away from frame rail 34, thereby allowing first crush can 26 to absorb some of the kinetic energy brought about by an encounter between vehicle 20 and an object. As shown in FIG. 4, inflation of first crush can 26 brings about elongation of the crush can, thereby increasing the distances between adjacent side wall ribs of ribs 131. In an example, in an inflated state, crush can 26 may elongate by an amount of between 15% and 150%. Crush cans 26 and 28 may include valleys between ribs 131 to allow the ribs to expand away from each other as crush cans 26 and 28 elongate.

Figure 5:
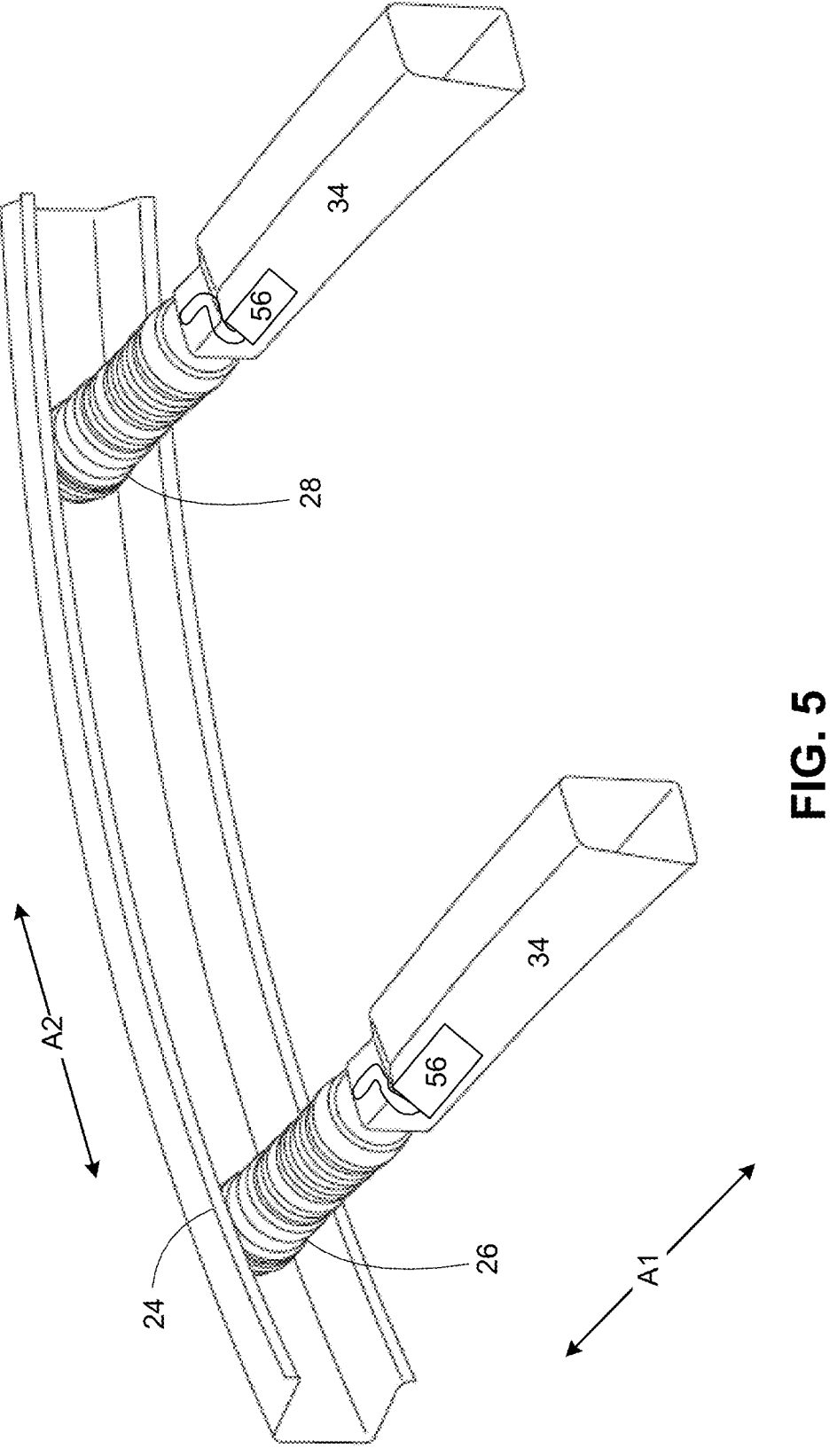
FIG. 5 is a rear view of crush cans in an inflated state.

FIG. 5 is a rear view of first crush can 26 and second crush can 28 in an inflated state. As shown in FIG. 5, in response to actuation of inflator 56, elongation of first crush can 26 and second crush can 28, bumper 24 may be extended away from a forward face of frame rail 34 to absorb kinetic energy resulting from vehicle 20 encountering an object. In an example, transition of first crush can 26 and second crush can 28 may bring about displacement of bumper 24 in a vehicle-forward direction of between 5.0 centimeters and 25.0 centimeters.

Figure 6:
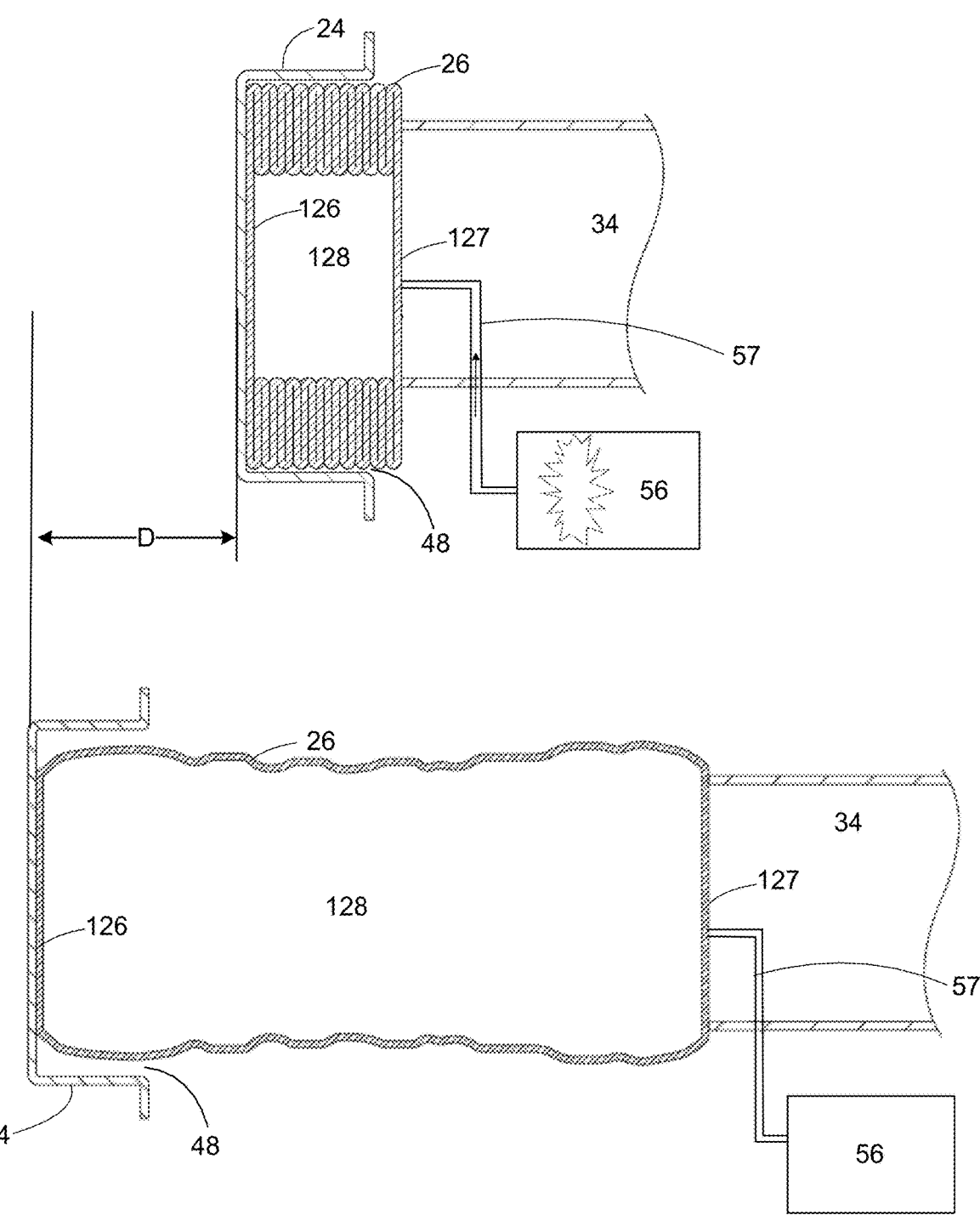
FIG. 6 is a side view of a crush can in uninflated and inflated states.

FIG. 6 is a side view of crush can 26 in uninflated and inflated states. As shown in FIG. 6, responsive to actuation of inflator 56, a compressible fluid (e.g., a gas) is conveyed through fluid conduit 57 to chamber 128. Consequently, chamber 128 expands to drive first base 126 of first crush can 26 toward bumper 24. In response to expansion of chamber 128, bumper 24 may be displaced by a distance D. In an example, a distance D may include a distance of, for example, between 5.0 centimeters and 25.0 centimeters.

With reference to FIG. 1, vehicle 20 includes vehicle computer 54, which includes at least one processor and a memory. Vehicle computer 54 may be a restraints control module and/or a body control module. Computer 54 may be a body control module. The memory accessed by computer 54 includes one or more forms of computer readable media, and stores instructions executable by the computer for performing various operations, including as disclosed herein. In an example, the computer 54 may be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, vehicle computer 54 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer. The memory may be of any type, e.g., hard disk drives, solid state drives, servers, or any volatile or non-volatile media. The memory may store the collected data sent from the sensors. The memory may be a separate device from the computer, and the computer may retrieve information stored by the memory via a vehicle communication network 62, e.g., over a CAN bus, a wireless network, etc. Alternatively or additionally, the memory may be part of the computer, e.g., as a memory of the computer.

As shown in FIG. 1, vehicle computer 54 is generally arranged for communications on the vehicle communication network 62 that may include a communications bus, such as a controller area network CAN or the like, and/or other wired and/or wireless mechanisms. Alternatively or additionally, in cases where computer 54 includes a plurality of devices, the vehicle communication network 62 may be used for communications between devices represented as the computer in this disclosure. Further, as mentioned below, various controllers and/or sensors may provide data to the computer via vehicle communication network 62.

The disclosure has been described in an illustrative manner, and it is to be understood that the terminology which has been used is intended to be in the nature of words of description rather than of limitation. It should be noted that use of "in response to," "based on," and "upon determining" herein, indicates a causal relationship, not merely a temporal relationship. As used herein, the adverb "substantially" means that a shape, structure, measurement, quantity, time, etc. may deviate from an exact described geometry, distance, measurement, quantity, time, etc., because of imperfections in materials, machining, manufacturing, etc.

Many modifications and variations of the present disclosure are possible in light of the above teachings, and the disclosure may be practiced otherwise than as specifically described.

What is claimed is:

1. A vehicle, comprising:

a vehicle frame and a vehicle bumper; and a crush can supporting the vehicle bumper on the vehicle frame;

the crush can having an inflation chamber and being inflatable from an uninflated state to an inflated state; and an inflator in fluid communication with the inflation chamber of the crush can, the inflator being designed to generate a pressure within the inflation chamber of the crush can of between 138 kilopascals and 241 kilopascals.

2. The vehicle of claim 1, wherein the crush can elongates along a vehicle-longitudinal axis from the uninflated state to the inflated state.

3. The vehicle of claim 1, wherein the crush can is metal.

4. The vehicle of claim 1, wherein:

the crush can is tubular with a central axis extending vehicle-forward from the vehicle frame to the vehicle bumper;

the crush can including a first base, a second base, and a side wall that extends from the first base to the second base about the central axis; and the first base, the second base, and the side wall surrounding the inflation chamber.

5. The vehicle of claim 4, wherein the side wall is generally cylindrical.

6. The vehicle of claim 5, wherein the crush can is metal.

7. The vehicle of claim 4, wherein the side wall is sealed to the first base and to the second base.

8. The vehicle of claim 4, wherein the side wall includes ribs extending annularly about the central axis.

9. The vehicle of claim 1, wherein the vehicle bumper has a cavity facing the vehicle frame and the crush can is disposed in the cavity.

10. The vehicle of claim 1, wherein the crush can is fixed directly to the vehicle bumper and the vehicle frame.

11. The vehicle of claim 1, wherein the vehicle frame includes a frame rail elongated along a vehicle-longitudinal axis and the crush can is fixed to a forward face of the frame rail.

12. The vehicle of claim 1, further comprising a second crush can spaced cross-vehicle from the crush can, the second crush can supporting the vehicle bumper on the vehicle frame, the second crush can having an inflation chamber and being inflatable from an uninflated state to an inflated state.

13. The vehicle of claim 12, wherein the vehicle frame includes a first frame rail and a second frame rail each elongated along a vehicle-longitudinal axis and spaced from each other cross-vehicle, the crush can being on the first frame rail and the second crush can being on the second frame rail.

14. The vehicle of claim 1, wherein the crush can is operable to bear a load of approximately one-half a weight of the vehicle bumper in a direction perpendicular to a central axis of the crush can.

15. A vehicle-bumper assembly, comprising:

a vehicle bumper;

a first crush can positioned in a cavity of the vehicle bumper, the first crush can having an exposed base for attachment to a forward face of a first frame rail of the vehicle, the first crush can having a first inflation chamber to transition from an uninflated state to an inflated state;

a first inflator in fluid communication with the first inflation chamber, the first inflator being designed to generate a pressure of between 138 kilopascals and 241 kilopascals for a duration of between 20 milliseconds and 40 milliseconds; and a second crush can positioned in the cavity of the vehicle bumper, the second crush can having an exposed base for attachment to a forward face of a second frame rail of the vehicle, the second crush can having a second inflation chamber to transition from an uninflated state to an inflated state, wherein the first crush can and the second crush can are operable to bear a combined load that includes a weight of the vehicle bumper when the first crush can and the second crush can are in the uninflated state.

16. The vehicle-bumper assembly of claim 15, wherein the first inflator is operable to transition the first crush can from the uninflated state to the inflated state responsive to a first electrical signal, and the second inflator is operable to transition the second crush can from the uninflated state to the inflated state responsive to a second electrical signal.

17. The vehicle-bumper assembly of claim 15, wherein the first crush can and the second crush can include a substantial percentage of a material that permits elongation between the uninflated state and the inflated state of between 15% and 150%.

18. The vehicle-bumper assembly of claim 15, wherein the first crush can and the second crush can include a circular cross-section having a diameter of between 40 millimeters and 60 millimeters and a length of 60 millimeters to 90 millimeters in the uninflated state.

19. A vehicle-bumper assembly, comprising:

a vehicle bumper;

a first crush can positioned in a cavity of the vehicle bumper, the first crush can having an exposed base for attachment to a forward face of a first frame rail of the vehicle, the first crush can having a first inflation chamber to transition from an uninflated state to an inflated state; and a second crush can positioned in the cavity of the vehicle bumper, the second crush can having an exposed base for attachment to a forward face of a second frame rail of the vehicle, the second crush can having a second inflation chamber to transition from an uninflated state to an inflated state, the first crush can and the second crush can being operable to bear a combined load that includes a weight of the vehicle bumper when the first crush can and the second crush can are in the uninflated state; and the first crush can and the second crush can include a circular cross-section having a diameter of between 40 millimeters and 60 millimeters and a length of 60 millimeters to 90 millimeters in the uninflated state.

20. The vehicle-bumper assembly of claim 19, further comprising:

a first inflator in fluid communication with the first inflation chamber to transition the first crush can from the uninflated state to the inflated state responsive to a first electrical signal; and a second inflator in fluid communication with the second inflation chamber to transition the second crush can from the uninflated state to the inflated state responsive to a second electrical signal.

21. The vehicle-bumper assembly of claim 19, further comprising:

a first inflator in fluid communication with the first inflation chamber, the first inflator being designed to generate a pressure of between 138 kilopascals and 241 kilopascals for a duration of between 20 milliseconds and 40 milliseconds.

22. The vehicle-bumper assembly of claim 19, wherein the first crush can and the second crush can include a substantial percentage of a material that permits elongation between the uninflated state and the inflated state of between 15% and 150%.

\* \* \* \* \*